(12) United States Patent
Nishanov et al.

(10) Patent No.: US 7,467,374 B2
(45) Date of Patent: Dec. 16, 2008

(54) SERIALIZATION FOR STRUCTURED TRACING IN MANAGED CODE

(75) Inventors: Gor Nishanov, Redmond, WA (US); Vitali Prokopenko, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 866 days.

(21) Appl. No.: 10/702,258

(22) Filed: Nov. 5, 2003

(65) Prior Publication Data

US 2005/0097110 A1    May 5, 2005

(51) Int. Cl.
*G06F 9/44* (2006.01)
(52) U.S. Cl. .................. 717/128; 717/124; 717/127; 717/129
(58) Field of Classification Search .......... 717/124–129
See application file for complete search history.

(56) References Cited

U.S. PATENT DOCUMENTS

| | | | | |
|---|---|---|---|---|
| 6,035,303 | A * | 3/2000 | Baer et al. ............... | 707/103 R |
| 6,083,281 | A * | 7/2000 | Diec et al. ............... | 717/128 |
| 6,609,130 | B1 * | 8/2003 | Saulpaugh et al. ......... | 707/102 |
| 6,633,888 | B1 * | 10/2003 | Kobayashi ............... | 707/103 R |
| 6,745,208 | B2 * | 6/2004 | Berg et al. ............... | 707/201 |
| 6,754,891 | B1 * | 6/2004 | Snyder et al. ............. | 717/128 |
| 7,150,004 | B2 * | 12/2006 | Russell et al. ............. | 717/118 |
| 2001/0054172 | A1 * | 12/2001 | Tuatini ................... | 717/1 |
| 2003/0131010 | A1 * | 7/2003 | Redpath .................. | 707/100 |
| 2004/0215797 | A1 * | 10/2004 | Hadley ................... | 709/230 |
| 2005/0071809 | A1 * | 3/2005 | Pulley .................... | 717/108 |

* cited by examiner

*Primary Examiner*—Lewis A. Bullock, Jr.
*Assistant Examiner*—Michael Yaary
(74) *Attorney, Agent, or Firm*—Workman Nydegger

(57) ABSTRACT

A system and method, useful in tracing program execution, for serializing data, such as an object data, into consistent, structured (e.g., XML) output. A serializer processes an object's data, and for each set of data, records the object's data in a structured (e.g., XML) format that reflects the object's current state. Nodes corresponding to fields and properties of the object are nested in the structure. Simple types define nodes with the current data value associated with the tag. More complex types including arrays, collections, dictionaries and exceptions are stored as individual members of a type, with any complex members further broken down into sub-nodes. Object data including custom collections, dictionaries, non-public fields and properties and properties with only get-accessor are serialized. The resulting output, such as in an XML formatted structure, is easy to read by humans, and is easily processed, such as for automated analysis purposes.

15 Claims, 7 Drawing Sheets

SERIALIZATION FOR STRUCTURED TRACING IN MANAGED CODE

FIELD OF THE INVENTION

The invention relates generally to computer systems, and more particularly to testing computer-related operations.

BACKGROUND OF THE INVENTION

Many software technologies in development, such as projects based on managed code, benefit from software tracing. Software tracing is a common practice in which during execution of a program, data is logged when checkpoints are reached in that program. The data is saved at a checkpoint, where it may be later analyzed for various purposes, including testing. For example, if a test fails, the data at one or more checkpoints can be examined to determine what (e.g., what function or sequence of instructions) caused the failure.

In order to make the data accessible, the data is written in some way. Typically, a tester would write the data to a flat text file. Then, the tester would have to rearrange the text into some custom format to help analyze the logged data.

Instead of having unstructured, plain text data, structured logging is another option, in which data is placed into a defined structure such that queries and the like may be performed against the data. Automated analysis, statistics gathering, comparison of the data against thresholds and other such techniques can be performed with structured log data.

Even with structured data, there was no standardization of the structure, and thus, for example, one tester's resulting data may be entirely different from another tester's resulting data, given the same input on the same code. To overcome this problem, some standardization of the structure was made available. For example, to perform structured logging in C# programming language, a library could use an XML serializer that is included in the .NET™ framework to provide more uniform tracing results.

However, there are a number of drawbacks to standardized serializers, including the standard XML serializer. For example, the standard XML serializer does not serialize protected and private properties and fields. However, for logging purposes, as much information as possible about a logged object is often needed, including information about protected properties and data fields. Somewhat similarly, the standard XML serializer cannot serialize custom collections, and cannot serialize dictionaries. Further, the standard XML serializer does not serialize properties that do not have both get-accessors and set-accessors, (note that in C#, for example, each property should have at least one accessor, either set or get, that allows access to that property's value). Another general drawback is that the standard serializer does not provide sufficient control over the serialization process, and has low performance first time any given type is serialized What is needed is an improved serializer system and method that preserves the original data, while making serialized data easy to read and analyze. The improved serializer should overcome the drawbacks of standard serializers that are available for managed code, and provide more control over the serialization process.

SUMMARY OF THE INVENTION

Briefly, the present invention provides a system and method for serializing data into consistent, structured output. In general, a serializer walks through an object's data, and for each set of data maintained by the object, e.g., object reference data and/or member data in fields or properties, records the object's data in a structured (e.g., XML) format that reflects the object's current state. When serializing, the object type may be used as a top level tag name, with nodes corresponding to fields and properties of the object nested in the top level node. The names of the fields and properties may be used as names of the tags that delineate those nodes, with types of the fields and properties placed in a type attribute. A hash also may be logged for each node.

To walk through the object's data, a serialize object process is performed on each set of data in the object until the object is fully serialized. Each type of data is determined, with an appropriate tag written for each type. For example, null data will have null tags, while simple types will have type tags indicative of the data type, such as Int, string, Int32 and so on, with the current value of that type associated with the tag (that is, within the node defined by the tag).

Because an object's data can reference an object, and that referenced object in turn may directly or indirectly circularly reference the referencing object, there is a possibility that serialization would result in an infinite loop. To avoid this, when an object has already been visited (serialized in whole or part) during a serialization request, that object's reference is tracked as having been visited. When serializing, for any object that is detected, a check is made as to whether that object has been visited, and if so, rather than again serializing the data of this object, a hash value is stored in the structured output to represent that object.

More complex types of data are also serialized by having the serialize object process call a serialize member process. To this end, a complex type (of a set of complex types including arrays, collections, dictionaries, exceptions, classes and structures) may need to be serialized for an object. In general, the serialize member process takes each member of a complex type, and reduces that member to one or more simpler types, recursively calling the serialize member process as needed until the member can be logged with its value. The SerializeMember process also watches for already visited objects to avoid circular referencing, e.g., a collection being serialized may contain a reference to an object that was already visited in this call.

Each object's data is thus structured in the log in a manner that is consistent and also highly readable from the perspective of a human user. This format greatly facilitates applying automated analysis tools to logs in order to trace code, which is particularly beneficial with respect to tracing and debugging failure exceptions.

In one implementation, a managed application (assembly) comprising code and metadata is configured for tracing by making calls (e.g., as coded by a tester) to a logging library of functions when checkpoints are reached during execution. The logging library invokes a structured tracer (e.g., an XML tracer) component to serialize the associated data, such as data in the form of one or more objects that are associated with the checkpoint call. The structured tracer includes the serializer that in turn provides the serialize object logic and serialize member logic.

The serializer obtains the type information for the various types of data that can be logged from the application's metadata by calling interfaces of reflection classes (e.g., provided in .NET™ in a common base library). Any code loaded by the application (e.g., DLLs) may also be accessed in a similar manner for relevant type information. The reflection classes are also invoked to provide the value for each property and/or field of a given object. The relevant type information may be cached in a types table so as to only call the reflection classes once per type.

Once the type information is known, for each set of data to log, the serializer runs the serialize object process, which may invoked the serialize member process, and obtains the current value to log based on the type.

An aspect of the present invention thus operates by receiving data to serialize, the data corresponding to data of an object, and by determining the data type. If the data comprises a simple type, the data is serialized into a structure by outputting a tag corresponding to the type and inserting a value for that type in association with the tag. If the data comprises a complex type, each member of the complex type is serialized.

For each set of data to be logged, means are provided for determining the type of data, and for serializing the data into structured output, including means for outputting a tag indicative of the type of data, and means for determining whether the data is a simple type or a complex type. For data of a simple type, the system includes means for obtaining a current value and for associating the current value with the tag. For data of a complex type, the system includes means for processing each member to output a member tag corresponding to the member, to obtain a current value for the member, and to associate the current value with the member tag.

A data structure results, comprising a first node including a tag indicative of an object identifier of an object, and a second node hierarchically below the first node, and including a tag indicative of a type of data in the object. If the type is complex corresponding to one of the set of complex types including array, collection, dictionary, or exception, a third node hierarchically below the second node indicates a type of data for at least one of the members within the complex type.

Other advantages will become apparent from the following detailed description when taken in conjunction with the drawings, in which:

DETAILED DESCRIPTION

Exemplary Operating Environment

Figure 1:
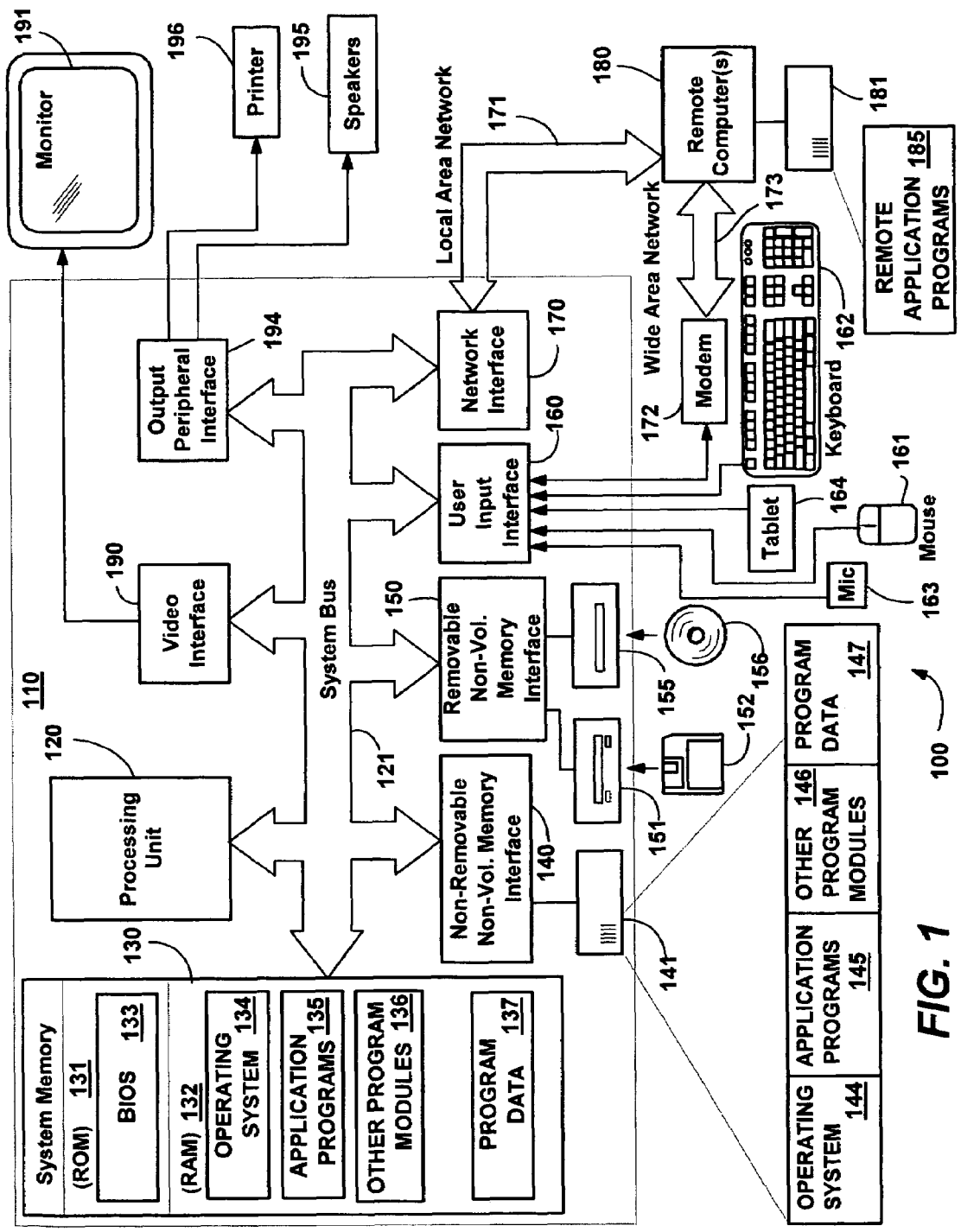
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Serialization

The present invention will be primarily described in an example Microsoft® .NET™ framework, in which some of the supporting structure and functionality is available via classes of a .NET™ common base library. Notwithstanding, it will be understood that the present invention only leverages these components, and can be easily adapted for use in other frameworks and environments by using similar or customized components, or alternative mechanisms. As will be understood, the present invention provides numerous benefits and advantages in contemporary computing without being limited to any particular framework or computing environment.

Figure 2:
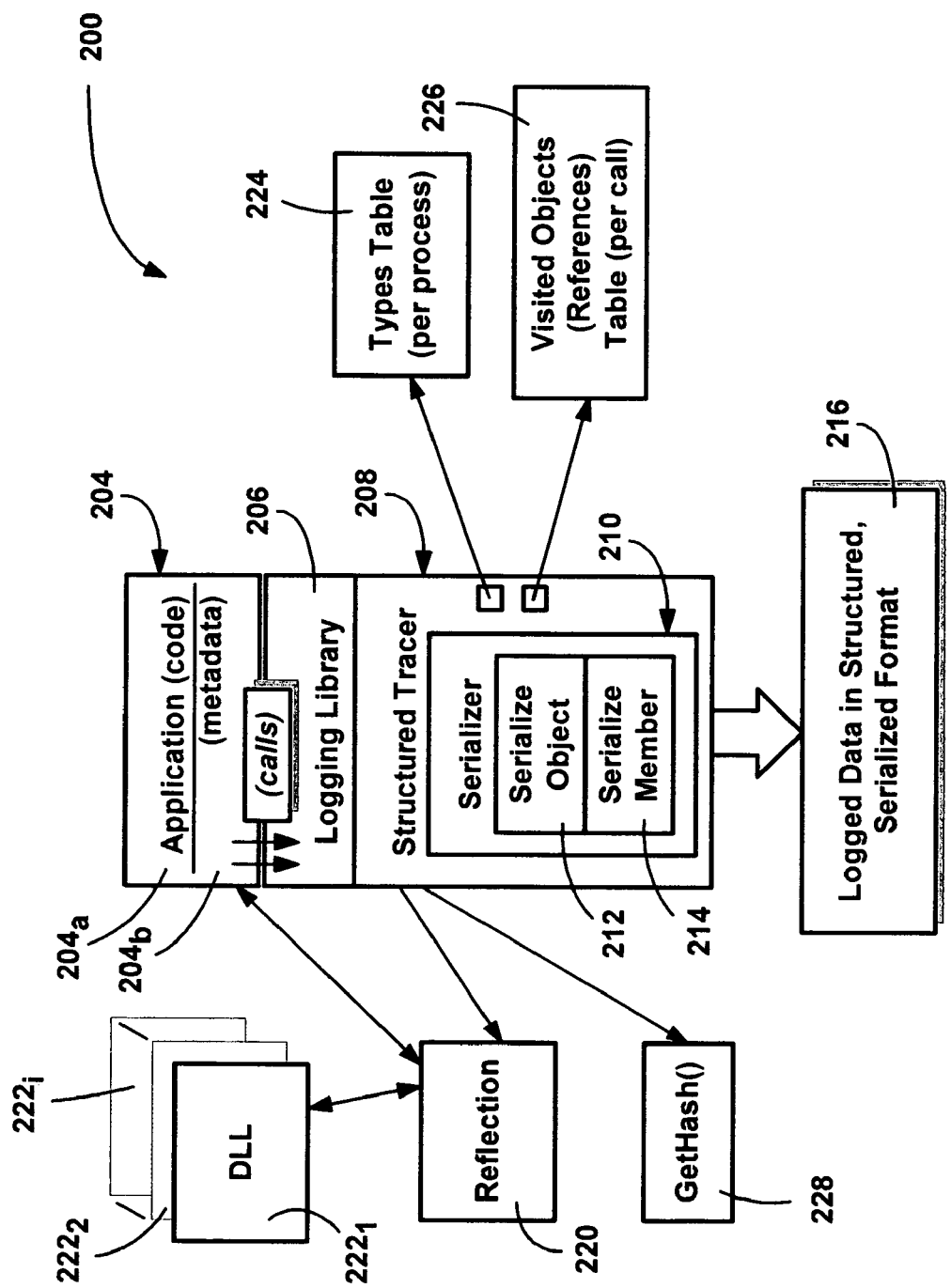
FIG. 2 is a block diagram generally representing an example architecture used to generate serialized, structured output data in accordance with an aspect of the present invention.

FIG. 2 shows a computing environment 200, e.g., utilizing .NET™ technology, in which the present invention may be implemented. In general, a managed application (assembly) 204, comprising code $204_a$ and metadata $204_b$, is configured for tracing by making calls (e.g., as coded by a tester) to a logging library of functions 206. For example, a tester, such as a person debugging a program, may add checkpoints at desired locations in the program code $204_a$, which when reached during execution will make the calls to the logging library 206 and provide associated data for logging, such as a reference to an object.

The logging library 206 can, if desired by the user (e.g., tester), log unstructured messages such as flat text. However, many benefits are provided by logging structured data, and as will be understood, further benefits are provided by logging structured data using the structured tracing mechanisms provided by the present invention.

In accordance with an aspect of the present invention, when the logging library is called, the logging library 206 may be configured to invoke a structured tracer (e.g., an XML tracer) component 208 to serialize the associated data, such as in the form of one or more objects that are associated with the checkpoint call, using the improved structured logging mechanisms of the present invention. In general, the structured tracer 208, described below with reference to FIGS. 3-6, includes a serializer 210 that serializes the data in an improved manner, e.g., it does not have the limitations of known standard (e.g., XML) serializers.

By way of example, the serializer 210 of the present invention, using the mechanisms/processes described below, e.g., including SerializeObject logic 212 and SerializeMember logic 214, serializes not only public properties and fields, but also protected properties and fields. The serializer 210 also serializes properties that have get-accessor specified (whereas the standard serializer serializes only properties that have both get- and set-accessors). Further, serialization for collections, arrays, exceptions and dictionaries are provided, along with other features of the improved serializer, as described below.

In order for the serializer 210 to log an object into the appropriate structured, serialized format 216, the serializer 210 needs the type information for the various types of data that can be logged. This is contained in the application's metadata $204_b$, and can be accessed via reflection classes 220, a set of classes provided in .NET™ in a common base library. In general the Reflection classes and interfaces provide a managed view of loaded types, methods, and fields.

Further, any code loaded by the application (e.g., DLLs) $222_1$-$222_i$ may also be accessed in a similar manner for relevant type information. The reflection classes 220 also can be invoked to provide the value for each property and/or field of a given object.

However, invoking the reflection classes for type information deals with a large amount of data and is expensive in terms of consuming computing resources. Thus in one implementation, the first time any type is serialized, a special record is created that has preprocessed information about that type. This record is maintained in a types table 224, e.g., on a per-process basis, essentially to cache the relevant type information for efficient access. The next time that data of the same type is serialized, the types table 224 provides the information very efficiently, via the information in the same record.

One other consideration is that a member of an object can be another object having its own members, each of which need to be serialized. As described below, the serialize member mechanism 214 may be called recursively to handle such situations. However, this means that objects can reference themselves, such as via a circular reference, in which a member of a first object references a second object, which in turn references the first object, either directly or indirectly by referencing one or more other objects. To avoid the infinite logging operation which would result, any object that has been "visited" (e.g., at least partially serialized) during each call to the logging library 206 is tracked in a visited object references table 226. In general, for each object being processed, the visited objects table 226 is accessed to compare its reference with any references in the visited objects table 226 to make sure that the object (which is a property of each object in the common language runtime) has not been already visited during this call. If so, a GetHash( ) function or the like is called to obtain a hash value for that object, and the hash value is logged. Note that the visited objects table is maintained per serialization call from the application to avoid the circular reference problem, and is cleared with each new call.

Once the type information is known, whether the first time via the access of the reflection class 220 to the metadata $204_b$, or via the types table 224, the serializer 210 can invoke the reflection class 220 to obtain the current value to log for the object. This obtaining of values is relatively efficient. The serializer 210 then logs the data in a structured format 216, as controlled to an extent by the tester, as described below.

Via this architecture, checkpoints in an application program have their data (e.g., of objects) logged in a structured, serialized format. The architecture has been implemented and has proven very efficient and reliable. Notwithstanding, it is feasible to have alternative implementations, which may be more efficient. For example, instead of using the reflection class 220, for each new type a special method may be dynamically generated to serialize that type, and the method made part of the class. To this end, upon seeing a new type, the alternative implementation dynamically generates C# code or the like, wherein the dynamically generated code provides the method that will serialize this object. The dynamically generated code is compiled, and then inserted as part of the class. The method may then be called, and also called thereafter whenever the same type is detected. Since the method is part of the class, it has access to the properties and fields of the object, which is more efficient and eliminates the need to invoke the reflection class 220 to get values for the properties and fields. Note that an even more efficient way would be to dynamically generate intermediate code for the method directly, that is, generate code that does not need to be compiled, as even though only done once per type, the compiling step to process the code into the intermediate language is relatively inefficient.

Figure 3:
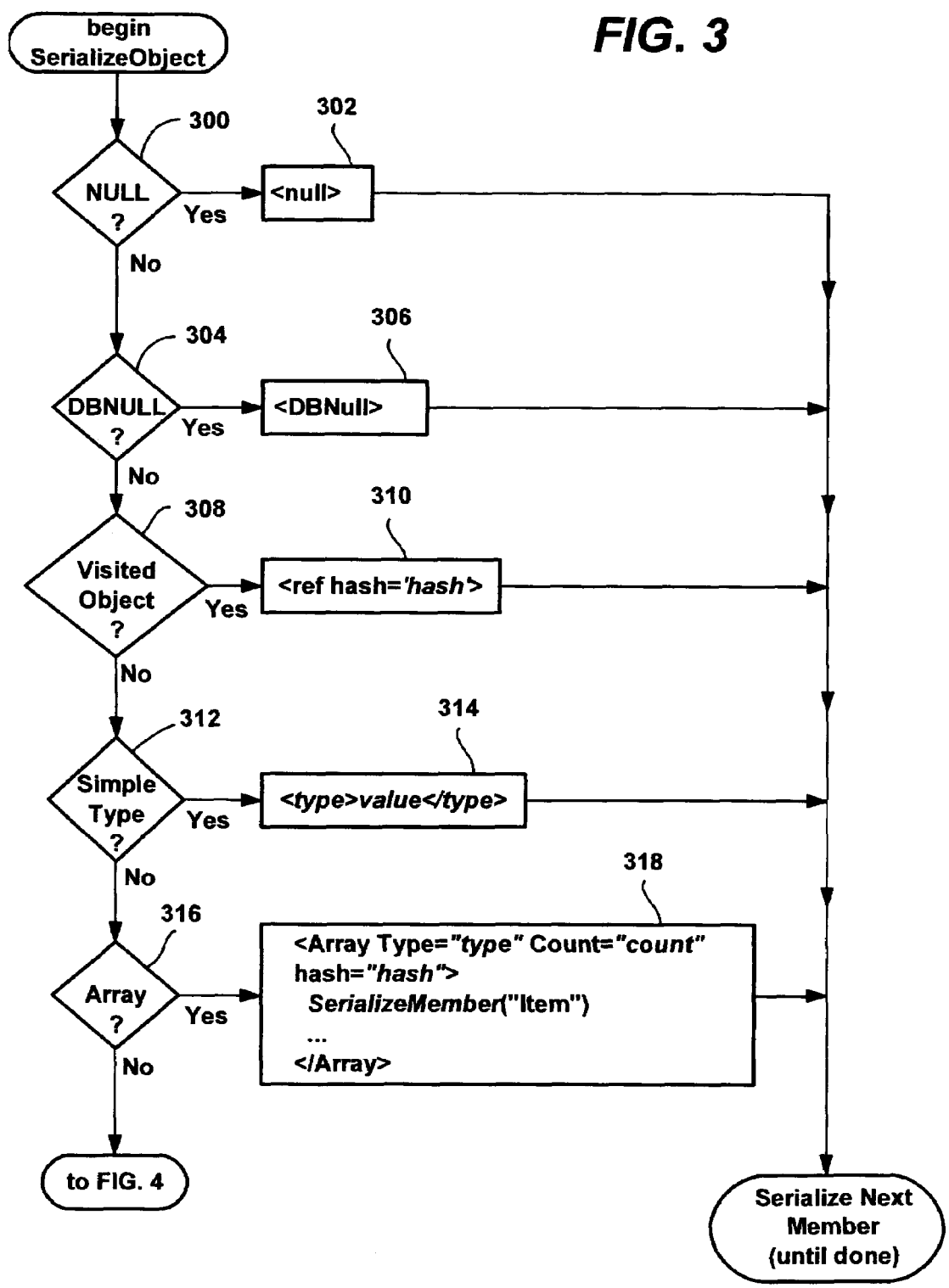
FIGS. 3 and 4 comprise a flow diagram generally representing an example process used to serialize an object, in accordance with an aspect of the present invention.
Figure 4:
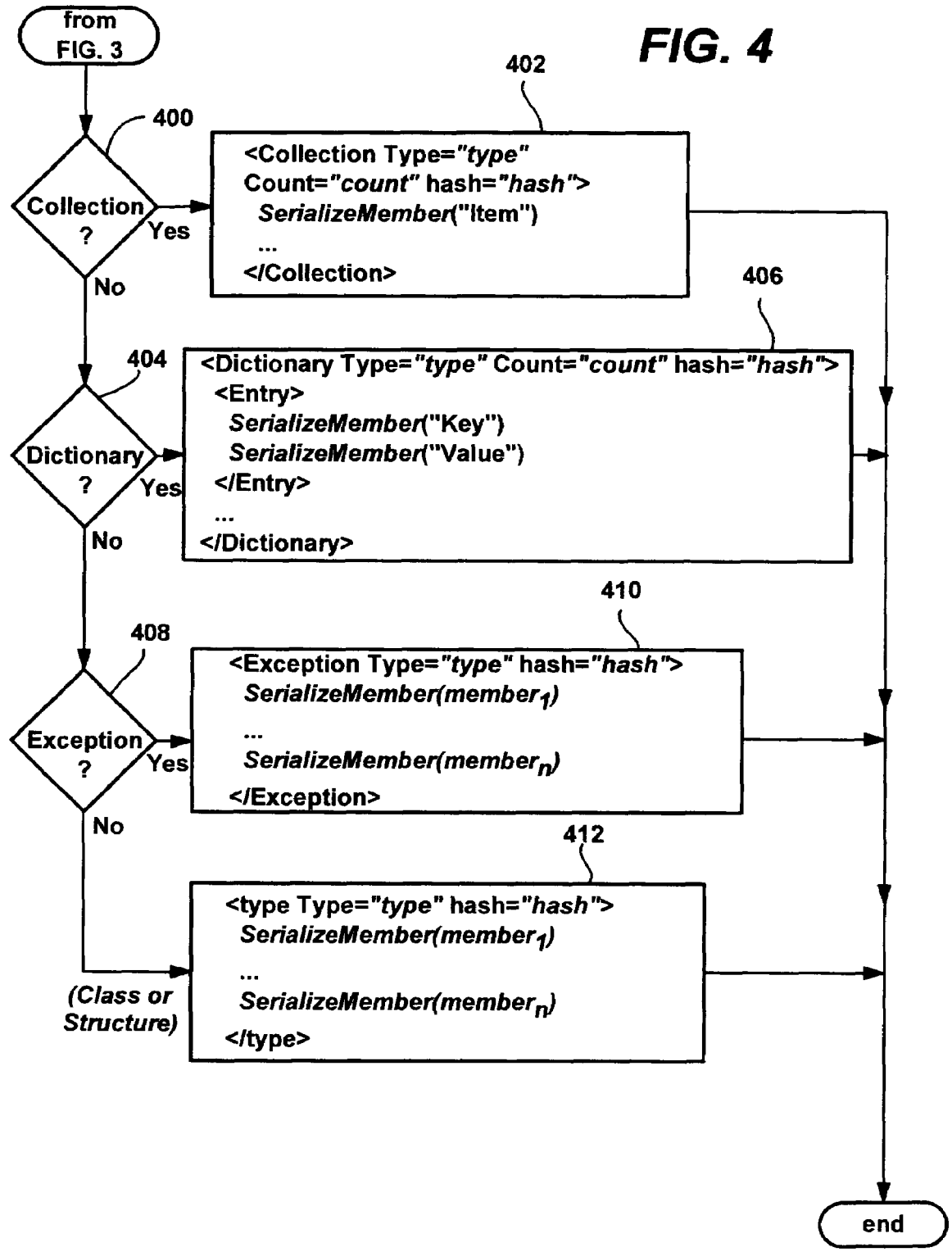
Figure 5:
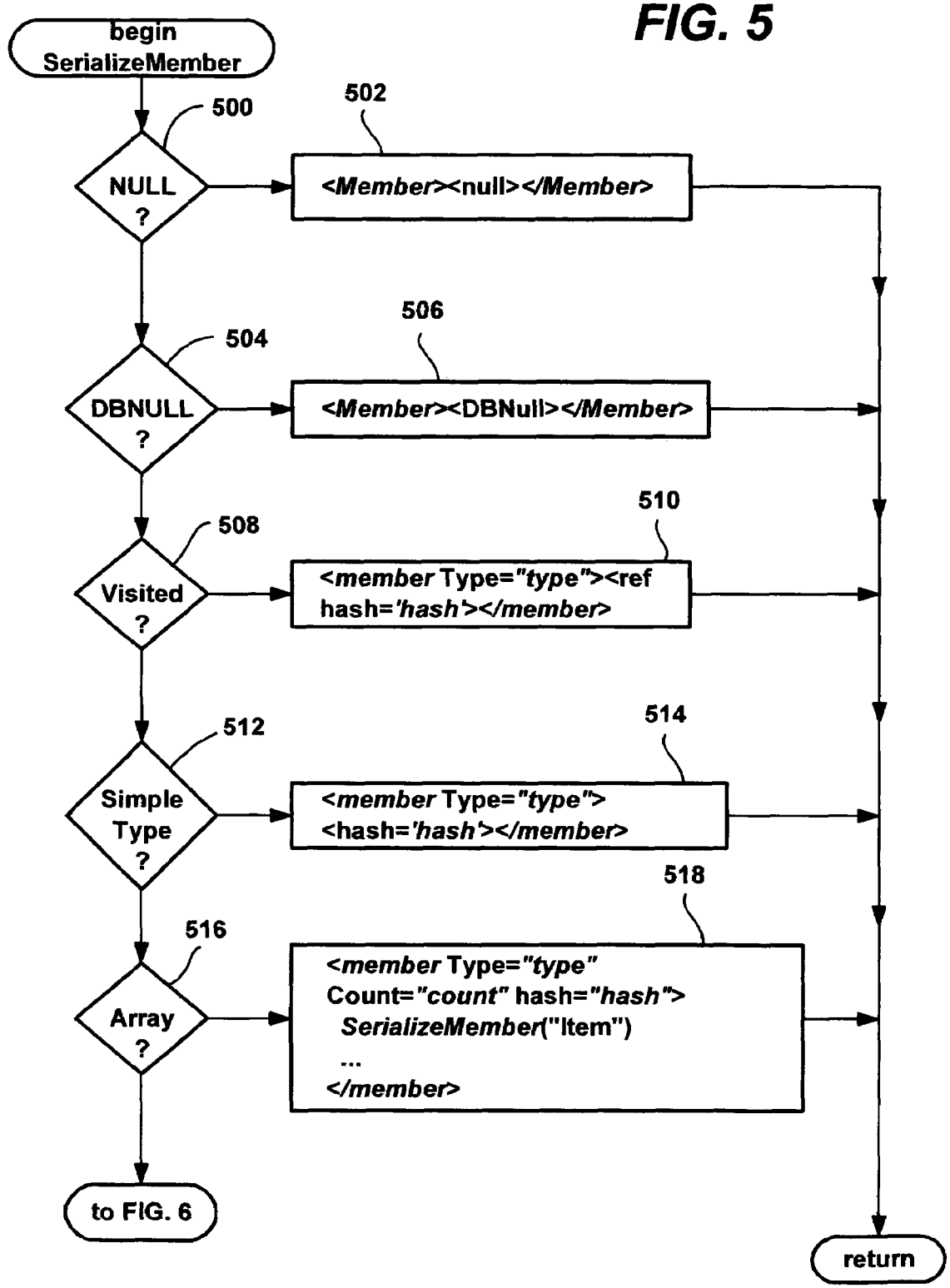
FIGS. 5 and 6 comprise a flow diagram generally representing an example process used to serialize a member of an object, in accordance with an aspect of the present invention.
Figure 6:
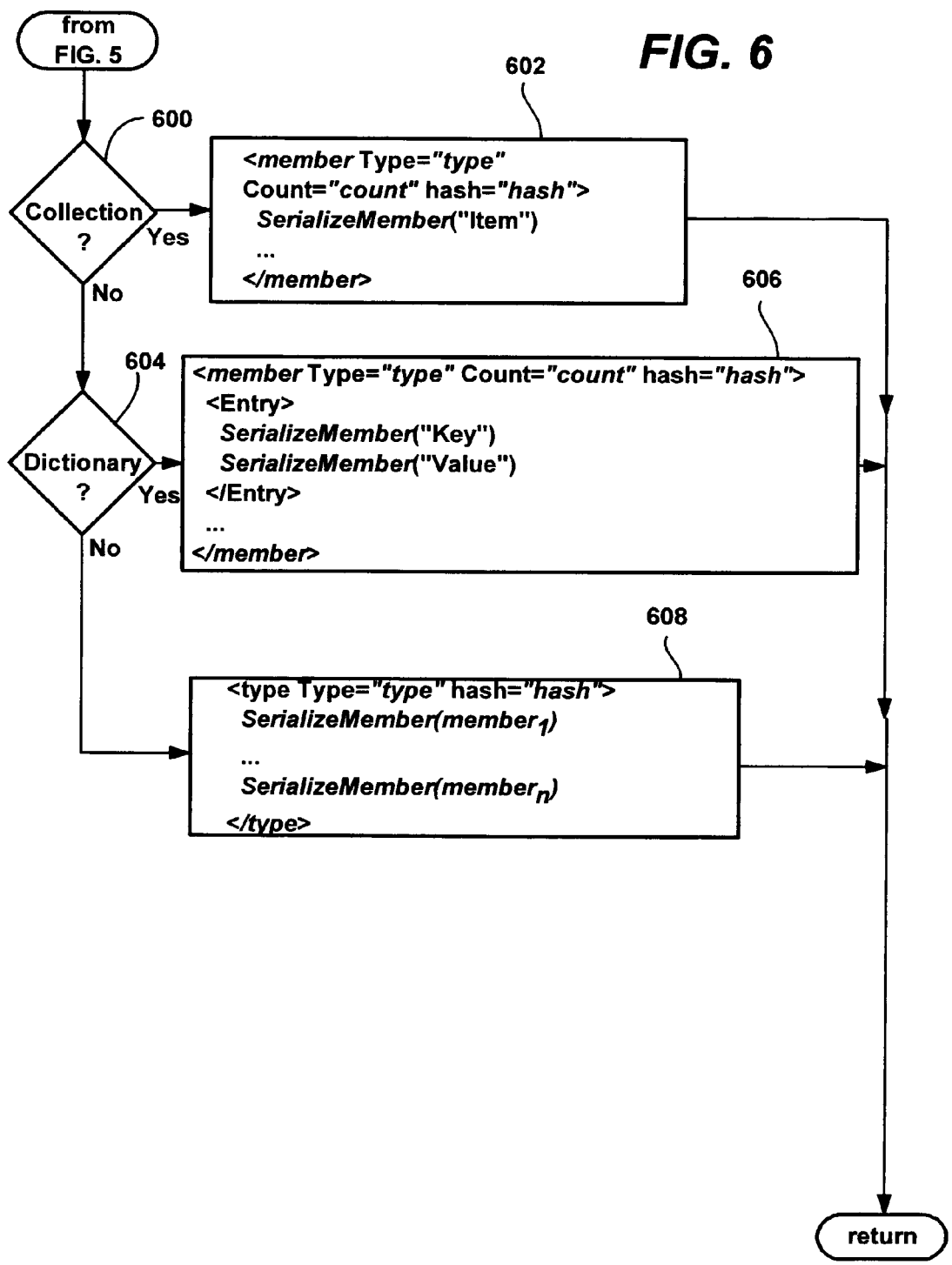
Figure 7:
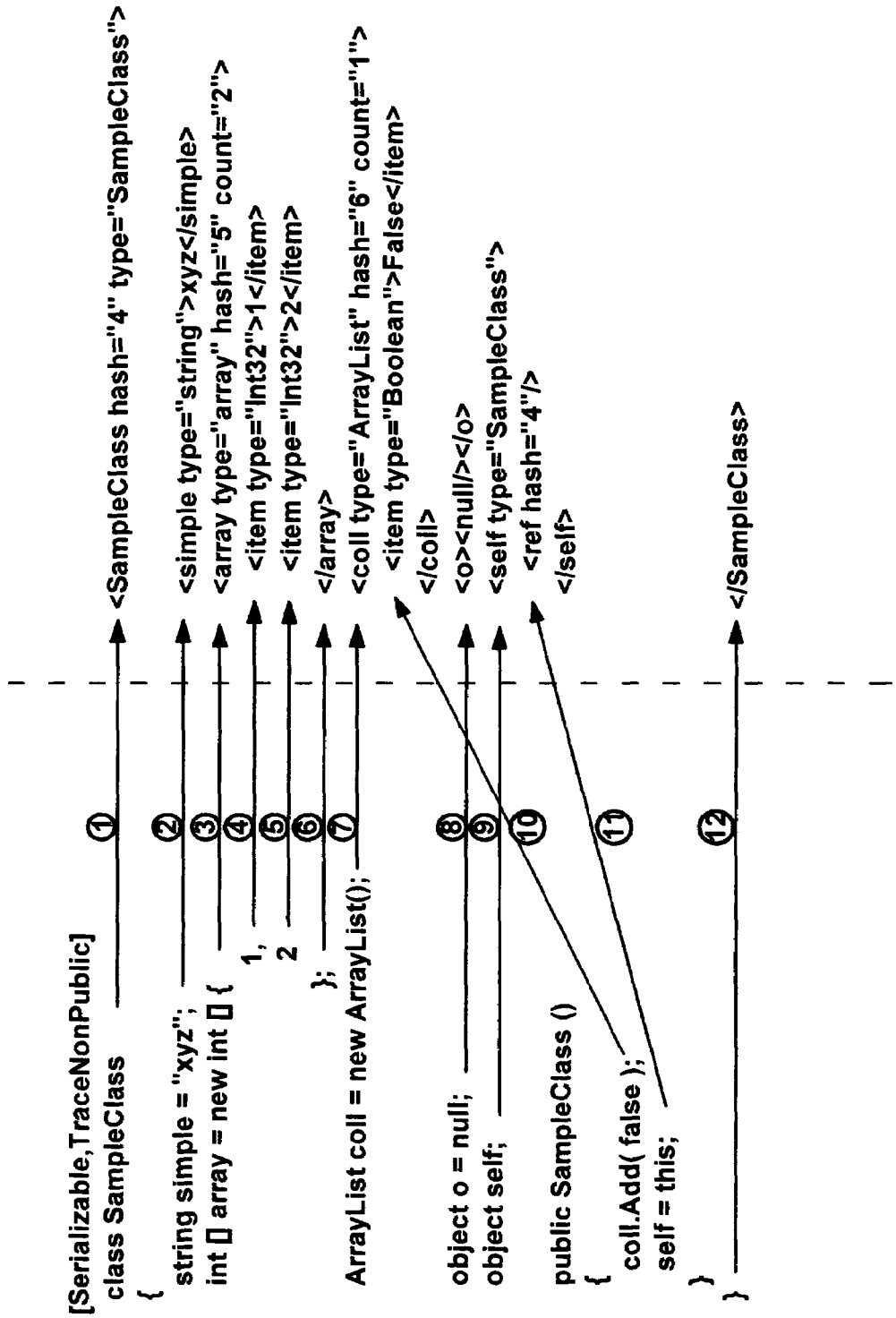
FIG. 7 is a representation of data of an example object being serialized into structured output data, in accordance with an aspect of the present invention.

Turning to an explanation of the serialization process with reference to the flow diagram of FIGS. 3-6 and the example of FIG. 7, FIGS. 3 and 4 represent the steps taken by the SerializeObject mechanism 212 to serialize an object. As will be understood, as part of processing, the SerializeObject mechanism 212 invokes (calls) the SerializeMember mechanism 214, which is described with reference to the flow diagram of FIGS. 5 and 6. As can be readily appreciated, the steps of FIGS. 3-6 represent evaluating the type information for a matching type, and thus the order of the steps is mostly arbitrary, except that the "visited" test needs to be performed before calling the SerializeMember process, to avoid recursion. For each object except a root, a type of object is written into type attribute; for a root object, the type is used as a tag.

In general, the serialize object mechanism walks through the object and for each set of data maintained by the object, e.g., object reference and/or member in fields or properties, records the object's data in a structured (e.g., XML) format that matches the object's current state. To this end, when serializing, the object type is used as a top level tag name. Nested in the top level node are nodes corresponding to fields and properties of the object, and the fields and properties names are used as names of the tags, with types of the fields and properties placed in a type attribute. Note that as used herein, the term "tag" may represent a single tag or a pair of related tags, e.g., "<Entry>" may be considered a tag, but also the term "tag" may represent a pair of related tags, e.g., "<Entry>" and "</Entry>" as appropriate. A hash is also logged. For example, consider the following structure output:

```
<CurrentSystemTimeZone hash='48'
type='CurrentSystemTimeZone'>
    <StandardName type='string'>Pacific Standard
Time</StandardName>
    <DaylightName type='string'>Pacific Standard
Time</DaylightName>
</CurrentSystemTimeZone>
```

To walk through the object's data, the process corresponding to the steps of FIGS. 3 and 4 is performed on each set of data in the object until the object is fully serialized. Note that null references are generally not serialized, except when the root of serialization is null (or when an item of an array is null, as described below). In this cases <null/> tag is written. Steps 300 and 304 represent testing whether data corresponds to such a root null type, e.g., an object that is Null or DBNull, respectively. If detected, there is no data to log for such an object, so instead, an appropriate Null or DBNull tag is simply added to the structured output at the appropriate hierarchical location, (as will become apparent below from the example of FIG. 7). Steps 302 and 306 represent adding the Null or DBNull tag, respectively.

As described above, an object's data also can reference an object that is not Null. If such an object reference is detected, as evaluated at step 308, step 308 further represents accessing the visited objects table 226 to determine whether that object has already been visited, as tracked via its reference, as described above. If so, to avoid possible problems resulting from recursion, rather than again serializing the data of this object (which will be serialized or in the process of being serialized from the previous visit), a hash value is obtained for this object and stored in the structured output, as presented by step 310. In other words, serialization performs loop detection by detecting when an object already has been serialized, and writing a special <ref> tag with the object identifier (hash).

By way of example, each property or field of an object type, including a top level object, has a hash attribute. If during serialization the serializer finds a reference to the same object, instead of serializing that object, the serializer via step 308 and 310 will put an object tag with the hash of original object into the log to avoid an infinite loop during serialization:

```
<LoopSample hash='51' type='LoopSample'>
    <self type='LoopSample'><ref hash='51'/></self>
</LoopSample>
```

Step 312 represents testing whether the data to log is a simple type, such as type int, or type string. If so, the value for that type is obtained via the reflection class 220, (or alternatively via a method call), as described above. This value is stored in the output along with its type information. Simple types are serialized using their type as a tag name. For example, a variable of type int with a value 1 is serialized to:

```
<int>1</int>
```

In keeping with the invention, more complex types of data are also serialized. For example, if an array is in the object, step 316 represents handling the array via step 318 by serializing each member of the array, by calling the serialize member process (SerializeMember 214) of FIGS. 5 and 6 for each item in the array. Note that a null item is serialized when in an array. The structure is tagged by an array indicator (e.g., in tag <array>), has a hash value, and includes a count of the number of items of the array, written into a count attribute. Each item is tagged by the type of item.

In the example of an array having items of a simple type, step 512 of the SerializeMember process performs the serialization. For example, consider a string array having two items "hello" and "world" therein; following the serialization of the array, the structured output would appear as in the following table (note however that the hash value is only an example):

```
<array hash='43' count='2'>
    <item type='string'>hello</item>
    <item type='string'>world</item>
</array>
```

Note that alternatively, when (as ordinary) an array contains items of all the same type, the item type could be extracted so as to not repeat it for each item. Although this saves space, this has the drawback that a type of a given item needs to be determined from another tag, rather than from the item tag. In any event, such an alternative logging is feasible, as follows:

```
<array hash='43' count='2' item type='string'>
    <item>hello</item>
    <item>world</item>
</array>
```

FIG. 4 shows how other types are handled by the serialization mechanism 210. Serialization of a collection, which in one implementation comprises a class that implements an IEnumerable or ICollection interface, is handled by steps 400 and 402, in which the collection is placed within a <collection> tag. As can be seen, step 402 calls the SerializeMember mechanism, e.g., for each item of the collection, which may vary in type within the collection. Null types may be serialized via steps 500-506. Note that in one implementation, the count attribute is added only if the class implements ICollection, that is the collection supports the ICollection interface:

```
<collection hash='41' count='3'>
    <item type='string'>1</item>
    <item type='Int32'>2</item>
    <item type='string'>three</item>
</collection>
```

Note that more complex types may be nested in other complex types, e.g., an array may be nested in a collection. As is readily apparent from reviewing the steps of FIG. 5 and 6, the serialize member process likewise handles each type separately, recursively calling SerializeMember when necessary. As with the SerializeObject process, the SerializeMember process also watches (at step 508) for already visited objects to avoid circular referencing, e.g., a collection being serialized may contain a reference to an object that was already visited in this call.

Returning to FIG. 4, step 404 handles the processing of a dictionary type, which is a type having entries, with each entry comprising a key and a value. The key and value may be simple types, such as a string, or complex type. For each entry, SerializeMember is called for each key and each value. If the dictionary is a type of an object from which serialization is started then it is placed in a <dictionary> tag, and for each item, the key and data are serialized. Note that as described below, for proper serialization, a dictionary property or field should have a TraceItemType attribute:

```
<DictionarySample hash='55' type='DictionarySample'>
    <dict hash='56' type='ListDictionary'>
```

-continued

```
<entry>
    <key type='string'>key1</key>
    <value type='string'>value1</value>
</entry>
<entry>
    <key type='string'>key2</key>
    <value type='string'>value2</value>
</entry>
</dict>
</DictionarySample>
```

An exception, detected at step 408 of FIG. 4, is another set of data that can be serialized, and is of particular value when tracing. An exception comprises a list of members, with SerializeMember called for each at step 410, resulting in the exception being placed in <exception> tag. If an exception is a root object, then it is serialized completely (even if a user did not ask to follow references, as described below).

For example, within an object, the following data:

```
log.Serialize( Level.Fail, "Unexpected exception",
    exception );
``` may produce the following output when logged in accordance with an aspect of the present invention:

```
<exception type='NullReferenceException'>
    <Message type='string'>Object reference not set to an
    instance of an object.</Message>
    <TargetSite type='string'>Void
    Main(System.String[ ])</TargetSite>
    <StackTrace type='string'>at
    TestLog.LogTest.Main(String[ ] args) in Test.cs:line
    29</StackTrace>
    <Source type='string'>Sample</Source>
    <HResult type='Int32'>−2147467261</HResult>
</exception>
```

Note that if not an exception at step 408, in one implementation, the data to be logged has to be class or structure. Step 412 handles such data that no other step has acted upon, as described above. In other implementations, if other data was to be specially logged, as can be readily appreciated, additional tests and handling are straightforward to implement in the described serialization scheme of the present invention.

As can be readily appreciated, each object's data is structured in the log in a manner that is consistent and also highly readable from the perspective of a human user. This format greatly facilitates applying automated analysis tools to logs in order to trace code, which is particularly beneficial with respect to tracing and debugging failure exceptions.

FIG. 7 provides an example of how the serialization process works for a simple example object. In FIG. 7, the object data appears on the left side, with its serialized and structured (XML) representation on the right. Thus, the class is simply logged by its name, along with a hash value, as represented by the arrow labeled one (1). A </SampleClass> tag indicates the end of this object, as represented by the arrow labeled twelve (12).

The string is a simple type, and thus when processed for serialization as described above, results in a type identification tag of "string" with the "xyz" value of the string between the tags. This is represented in FIG. 7 by the arrow labeled two (2).

An array of simple types (Int32) is processed such that the array is identified along with a hash and count (the arrow labeled three (3)), with each item listed by its type (the arrows labeled four (4) and five (5)), followed by an array tag (the arrow labeled six (6)).

A collection having a single Boolean item equal to false is also serialized in the manner described above, as represented by the arrows labeled seven (7) and ten (10). A null object is also serialized as represented by the arrow labeled eight (8), and an object that is already referenced is only serialized once, as represented by the arrows labeled nine (9) and eleven (11).

As can be seen from this example, not only is the logging structured in a logical manner, but the resultant output is relatively easy to read.

In accordance with another aspect of the present invention, additional features provide the user with the ability to control serialization to an extent. In one implementation, control is achieved via attributes described in the serialization namespace. For example, via these attributes, serialization can be performed for non-referenced properties, or references can be followed to a specified depth. While following references, the serializer nests a referenced object's XML inside a current object's XML. Further, while following references, each object is assigned an identifier which is the object's hash code.

In general, use of these attributes may provide reduced or filtered logging, such as to reduce the effect of logging on stress or to reduce logging because of network bandwidth. For example, using attributes user can define whether or not serialize non-public properties and fields, or exclude specific properties/fields from serialization. Notwithstanding, filtering should be used carefully, so as to not adversely impact on test execution, but rather to reduce amount of logged information to only that which is presently of interest. In many cases, post-processing of the log may be a preferred way to focus on relevant data.

To control the way objects are serialized, the logging library 206 provides several attributes, e.g., in a .NET™ environment, located in the Microsoft.Wtt.Log.Serialization namespace.

A TraceIgnore attribute instructs tracing not to serialize a specified field or property. For example:

```
public class SampleClass
{
    public int a = 1;
    [TraceIgnore]
    public int b = 2;
}
``` results in only the "a" value being logged:

```
<SampleClass>
    <a type='Int32'>1</a>
<SampleClass>
```

A TraceAsText attribute instructs tracing to call a ToString( ) function, instead of performing serialization. For example:

```
public class SampleClass1
{
    public int a = 1;
    public override string ToString ( )
    {
        return "ToString( )";
    }
}
public class SampleClass2
{
    public int b = 2;
    [TraceAsText]
    public SampleClass1 o = new SampleClass1( );
}
``` results in:

```
<SampleClass2>
    <b type='Int32'>2</b>
    <o id='1234' type='SampleClass1'>ToString( )</o>
</SampleClass2>
```

A TraceTypeOnly attribute instructs the serializer to write the type name only, without data, as in the following example:

```
public class SampleClass
{
    [TraceTypeOnly]
    public object o = new SampleClass( );
}
``` which results in:

```
<SampleClass>
    <o type='SampleClass'/>
</SampleClass>
```

A TraceElement attribute instructs tracing to use a specified tag name instead of a field or property name, as in the following example:

```
public class SampleClass
{
    [TraceElement("sample")]
    public int a = 1;
}
``` which results in:

```
<SampleClass>
    <sample type='Int32'>1</sample>
</SampleClass>
```

A TraceAsCollection attribute instructs tracing to trace class as a collection, as in the following example:

```
[TraceAsCollection]
public class SampleCollection : IEnumerable
{
    // Implementation of IEnumerable
}
``` which results in:

```
<collection>
    <item>item1</item>
    <item>item2</item>
    ...
</collection>
```

Note that the class should implement IEnumerable; this attribute is ignored on classes that do not implement IEnumerable.

The TraceNonPublic attribute instructs tracing to trace non-public members, as in the following example:

```
[TraceNonPublic]
public class SampleClass
{
    protected int a = 1;
}
``` which results in:

```
<SampleClass>
    <a type='Int32'>1</a>
</SampleClass>
```

The TraceItemType attribute indicates that a particular collection contains only objects of the specified type. This attribute is valid for properties and fields that implement ICollection or IDictionary only, and is ignored for others.

For dictionaries, one of the following three optional properties can be specified:

| | |
|---|---|
| KeyType | Type of objects used as a key in a dictionary |
| KeyField | Item type of the collection contains the key in particular field. If specified. DictionaryEntry.Key is not serialized. In the future it can also be used during deserialization. When a deserializer adds a value to dictionary, it will associate the value with a key from the indicated KeyField. |
| KeyMethod | Key can be derived from an item type by invoking object GetKey( ) method. If specified DictionaryEntry.Key is not serialized. In the future this information can also be used during deserialization. When a deserializer adds a value to dictionary, it will associate the value with a key returned from GetKey method. |

If none of the optional properties is specified a KeyType equal to typeof(object) is assumed.

Consider a class contains a dictionary which maps strings to objects, where item contains Name field that contains the key value for an object:

```
class Item
{
    string Name;
    int data;
}
```

For the following declaration:

```
HybridDictionary dict;
``` the serializer will work as if the following attribute was defined:

```
[ElementType(typeof(object), KeyType=typeof(object)]
```

This will cause serialization of two type descriptors, since a subsequent deserializer does not know what type a particular value will end up to be. Also, the key is passed twice; a first time as a part of the key, a second time as a part of the structure.

A more advantageous way may be to mark the field declaration as follows:

```
[ElementType(typeof(Item), KeyField = "Name")]
HybridDictionary dict;
```

In this case, only the data of class Item will be serialized; the type is known before hand and the key can be deduced from the value itself.

The following table summarizes various methods used to implement structured tracing in accordance with an aspect of the present invention:

| Public Instance Constructors | |
|---|---|
| XmlTracer | Overloaded. Initialize a new instance of the XmlTracer class (e.g., structured tracer 208 of FIG. 2). |
| Public Instance Methods | |
| Equals (inherited from Object) | Determines whether the specified Object is equal to the current Object. |
| GetHashCode (inherited from Object) | Serves as a hash function for a particular type, suitable for use in hashing algorithms and data structures like a hash table. |
| GetType (inherited from Object) | Gets the Type of the current instance. |
| Serialize | Overloaded. Serializes object. |
| ToString (inherited from Object) | Returns a String that represents the current Object. |
| Protected Instance Methods | |
| Finalize (inherited from Object) | Allows an Object to attempt to free resources and perform other cleanup operations before the Object is reclaimed by garbage collection. |
| MemberwiseClone (inherited from Object) | Creates a shallow copy of the current Object. |

As can be seen from the foregoing detailed description, there is provided a method and system structured logging in which the custom collections, dictionaries, non-public fields and properties and properties with only get-accessor may be serialized. The resulting output such as in an XML formatted structure is easy to read by humans, and is easily processed, such as for automated analysis purposes. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method of logging tracing data into a consistent and structured output, the method comprising:
   providing public methods for implementing structured tracing comprising:
      XmlTracer which initializes a new instance of an XmlTracer class,
      GetHashCode which serves as a hash function for a particular type for use in hashing algorithms and data structures,
      GetType which gets the type of a current instance of a tracer object,
      Serialize which serializes the tracer object, and
      ToString which returns a string that represents the current tracer object; providing attributes used for controlling the way in which objects are serialized comprising:
      TraceIgnore for ignoring a particular field or property,
      TraceAsText for tracing a call to a ToString function instead of serializing,
      TraceTypeOnly for writing a type name only without data,
      TraceElement for using a specified tag name,
      TraceAsCollection for tracing a class as a collection,
      TraceNonPublic for tracing non-public class members, and
      TraceItemType for indicating if a particular collection contains only objects of a specified type;
   during the execution of a program to be traced, upon reaching a checkpoint, outputting data corresponding to the data of an object;
   receiving the data corresponding to data of an object;
   accessing a visited object table to determine if the object has previously been visited;
   when an object has not been previously visited, tracking the object in the visited object table;
   determining the data type by accessing metadata via reflection classes;
   when the data comprises a simple type, serializing the data into a structure based on the attributes by outputting a tag corresponding to the type and inserting a value for that type in association with the tag; and when the data comprises a complex type, serializing each member of the complex type; and writing the serialized data to a storage media.

2. The method of claim 1 wherein determining the data type comprises invoking an object to access the metadata of a managed application.

3. The method of claim 2 further comprising, recording type information in a types table.

4. The method of claim 3 wherein determining the data type comprises accessing the types table.

5. The method of claim 1 wherein the type corresponds to a complex type comprising an array of items, and wherein serializing each member comprises, calling a serialize member process, the serialize member process outputting a tag corresponding to an item of the array and inserting a value for the item in association with the tag.

6. The method of claim 5 wherein outputting a tag corresponding to the item comprises outputting a tag that identifies the data type of the item.

7. The method of claim 5 further comprising outputting a count corresponding to a number of items in the array.

8. The method of claim 1 wherein the type corresponds to a complex type comprising a collection of items, and wherein serializing each member comprises, calling a serialize member process, the serialize member process outputting a tag corresponding to an item of the collection and a type for the item, and inserting a value for the item in association with the tag.

9. The method of claim 8 further comprising outputting a count corresponding to a number of items in the collection.

10. The method of claim 8 wherein inserting the value for the item in association with the tag further comprises recursively calling the serialize member process to serialize the item.

11. The method of claim 1 wherein the type corresponds to a complex type comprising a dictionary of entries of dictionary keys and dictionary values, and wherein serializing each member comprises, outputting an entry tag corresponding to an entry of the dictionary and calling a serialize member process, the serialize member process outputting a key tag corresponding to the entry's dictionary key and in association with the entry tag, and inserting a current value for the dictionary key in association with the key tag, and outputting a value tag corresponding to the entry's dictionary value and in association with the entry tag, and inserting a current value for the dictionary value in association with the value tag.

12. The method of claim 8 wherein inserting the value for the item in association with the tag further comprises recursively calling the serialize member process to serialize a dictionary key and recursively calling the serialize member process to serialize a dictionary value.

13. The method of claim 1 wherein the type corresponds to a complex type comprising an exception having at least one member, wherein serializing each member comprises, calling a serialize member process, the serialize member process and recursively calling the serialize member process to serialize the member, and further comprising outputting a tag corresponding to an exception, and associating the tag with at least one serialized member.

14. The method of claim 1 wherein the data references another object, and further comprising, determining whether the other object was already visited, and when the object was already visited, outputting a hash of the other object, and when the other object was not already visited, serializing the other object and maintaining data that indicates that the other object has been visited.

15. A computer-readable storage media having encoded thereon computer-executable instructions which, when executed by the computer environment, perform the method of claim 1.

* * * * *